(12) United States Patent
Canegallo et al.

(10) Patent No.: US 7,284,303 B2
(45) Date of Patent: Oct. 23, 2007

(54) CLIP TYPE SYSTEM FOR BAGS AND METHODS OF MANUFACTURE

(75) Inventors: Pirottavio Canegallo, Tortona (IT); Giulio Ghisolfi, Pavia (IT)

(73) Assignee: RUSTYDOG Inc. (PA)

( * ) Notice: Subject to any disclaimer, the term of this patent is extended or adjusted under 35 U.S.C. 154(b) by 47 days.

(21) Appl. No.: 10/539,605

(22) PCT Filed: Jan. 23, 2004

(86) PCT No.: PCT/IT2004/000012

§ 371 (c)(1),
(2), (4) Date: Jun. 17, 2005

(87) PCT Pub. No.: WO2004/067388

PCT Pub. Date: Aug. 12, 2004

(65) Prior Publication Data

US 2006/0053596 A1    Mar. 16, 2006

(30) Foreign Application Priority Data

Jan. 27, 2003    (IT)    ............................ MI2003A0125

(51) Int. Cl.
*B65D 77/18*    (2006.01)

(52) U.S. Cl. .................. 24/30.5 R; 24/703.1; 24/704.2
(58) Field of Classification Search ............. 24/30.5 R, 24/543, 487, 518–520, 559, 703.1, 704.2; 383/61.2, 63, 68, 78, 81; 292/307 R
See application file for complete search history.

(56) References Cited

U.S. PATENT DOCUMENTS

| | | | |
|---|---|---|---|
| 4,656,697 A | * | 4/1987 | Naslund ................. 24/30.5 P |
| 5,054,168 A | | 10/1991 | Gandy et al. |
| 5,125,133 A | | 6/1992 | Morrison |
| 5,713,108 A | * | 2/1998 | Solomon et al. ......... 24/30.5 R |
| 6,058,572 A | | 5/2000 | Folkmar |

FOREIGN PATENT DOCUMENTS

| | | |
|---|---|---|
| DE | 84 33 963 U | 1/1985 |
| DE | 299 07 150 U | 8/1999 |
| GB | 2 201 651 A | 9/1988 |

* cited by examiner

*Primary Examiner*—James R. Brittain
(74) *Attorney, Agent, or Firm*—Dickstein Shapiro LLP

(57) ABSTRACT

The clip system to close/open bag mouth, comprises in combination:—female-male-elements;—means of articulation acting as snap free spring;—anti-tampering means;—sealing means;—means to smoothly tear cutting;—handle means to transport the container;—and reinforcing sleeve to avoid unhooking of heavy containers.

9 Claims, 9 Drawing Sheets

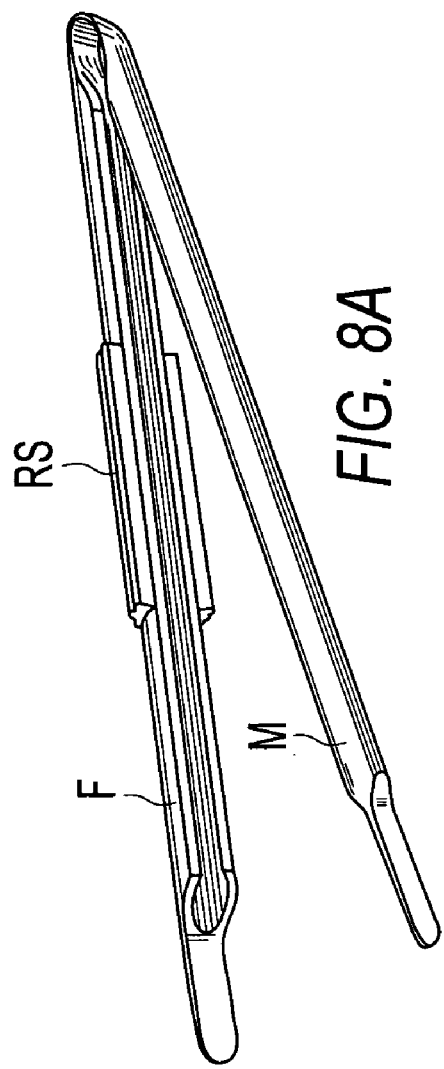
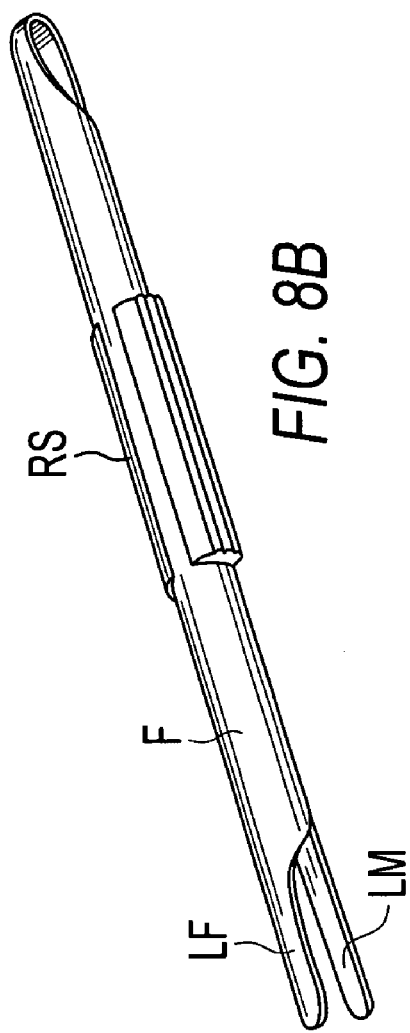
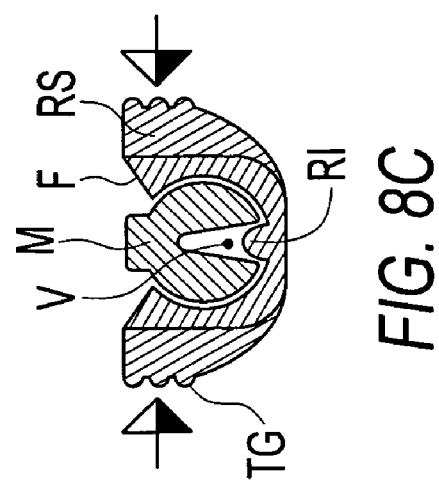

CLIP TYPE SYSTEM FOR BAGS AND METHODS OF MANUFACTURE

The invention concerns systems for sheet bodies preferably formed as containers, comprising:—a device substantially of the clip type;—a sheet body to be repeatedly opened and closed as well as to be protected against tampering.

The invention comprises also the relevant methods to manufacture said devices as well as their application on preferably preformed zones of said bodies.

In an embodiment of wide, immediate and economical utilization, the system substantially comprises:—a body of containment with coupling means in pre-established positions; and—a clip device consisting of two major components of reciprocal coupling/uncoupling, in particular of the male respectively female type, integral with:—conjunction means of controlled elasticity;—articulation means;—sealing means;—movimentation means;—tear-cut means;—anti-tampering means; and—undesired unhooking inhibiting means.

The invention further comprises methods to manufacture said devices and to assembly them with said containers, as well as an additional process, mechanism or station of on-line assembly.

PRIOR ART

With the always increasing diffusion of the packaging mainly made of synthetic flexible materials, is exponentially increased the need of systems and devices able to block, close, open, handle, and protect said bodies, as well as to dose the material therein contained generally in quantities above the mono-dose.

To face these exigencies, several solutions have been proposed, which have patent crowded the relevant technological field, not only because of the diversity of the demands but also because of the inadequacy and inexistence of a radical solution capable to satisfy at least the most urgent market needs.

Just to fix the ideas it seems convenient to refer to the most significant inventions according, e.g., to the U.S. Pat. No. 3,266,711, U.S. Pat. No. 4,487,945, U.S. Pat. No. 4,887,335, U.S. Pat. No. 4,926,526, U.S. Pat. No. 6,058,572 and to the European Patent Applications EP No. 0156779 and No. 0625949 B1 (corresponding to U.S. Pat. No. 5,598,608 and WO 93/16930).

The major part of the suggested solutions is centralized and resort to additional mechanism to block and unblock said clip devices.

Emblematically claim 1 of said EP 0625949 B1 recites a plastic clip applicable on a container portion and consisting of two articulated members which can be coupled so to lock or seal said portion, and to be uncoupled (unlocked) with the aid of a snap-lock arrangement at the free ends of said members, one of which additionally comprises an elastically resilient bridge having a slight arcuate convex configuration with a tongue which locks on a shoulder of the other member.

U.S. Pat. No. 5,713,108 and U.S. Pat. No. 5,054,168 describe and claim means comprising tongues, shoulders and flanges, associated to the locking and reception members, respectively means to cut container portions.

On its turn U.S. Pat. No. 6,058,572 claims the improvement consisting in a "laguna" obtained by ribs and lips portions.

In substance the Prior Art seems conditioned by the need to provide separate additional mechanisms each of which accomplish one or at most two functions: indeed it is neither described nor hinted a multi-functional, simple, synthetic device. And this might be one of the reasons of the absence or disappearance out of the market of the major part of the Prior Art devices at least apparently near or similar to those according to the invention.

One of the main objects of the present invention is to provide a system comprising a bag clip which eliminates the inconveniences and deficiencies of the Prior Art.

Now the fundamental object of the invention is to provide a device so structured to accomplish not only one contemporaneous ensemble of functions but also to attain a maximum-maximum of characteristics and performances, on the combination of which lay heavy not only the silence but also the technical prejudice of the Prior Art.

A further object of the invention is to provide methods for the best manufacture and utilization of said device and for its preferably on-line assembly with the containers.

The more important characteristics of the invention are recited in the claims at the end of this specification which may however be considered herewith incorporated.

BRIEF DESCRIPTION OF THE DRAWINGS

The various features and advantages of the invention will better appear from the following description of the (illustrative but not limitative) embodiments shown in the accompanying drawings in which:

FIGS. 7A-7B and 8A-8B are perspective views of clips inserted on-line on already closed bags, thus with anti-tampering tongue opened (FIG. 7A) and advantageously soldered (FIG. 7B) at the end of the line (FIGS. 7A and 7B), respectively of clips for the heavy bags (e.g. above 3 Kg) reinforced with a sleeve RS on female component F (FIGS. 8A and 8B);

FIG. 8C is a cross-section view of the reinforcing sleeve RS on the female component F for heavy bags.

DETAILED DESCRIPTION OF THE INVENTION

Figure 1:
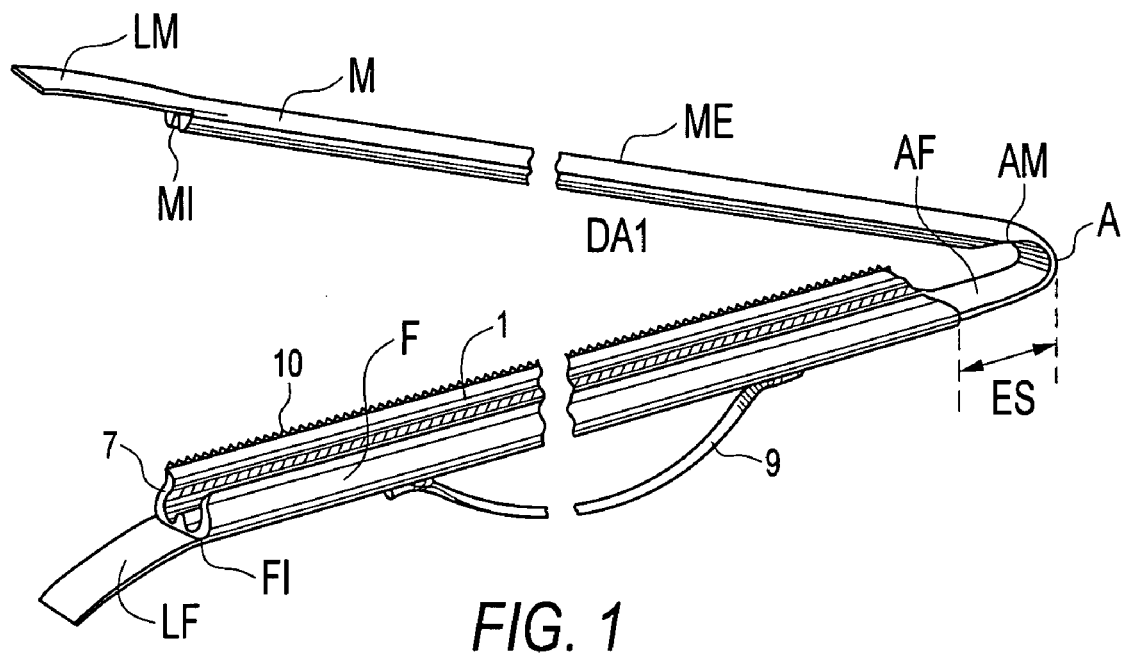
FIGS. 1 and 2 are schematic perspective views of the clip device according to the invention, with the two components, male M and female F, in open (uncoupled) position (1), respectively in closed (coupled) position (2) (FIG. 2); therefore wherever the references (1) and (2) appear associated to components M, F and C (containers, bags), they characterize same components in said positions, open (1) respectively closed (2)
Figure 2:
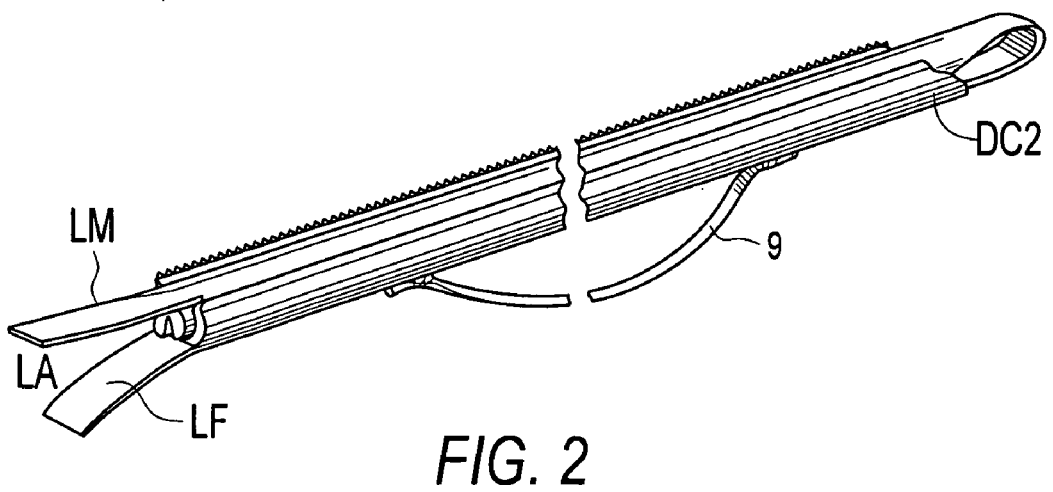
Figure 5A:
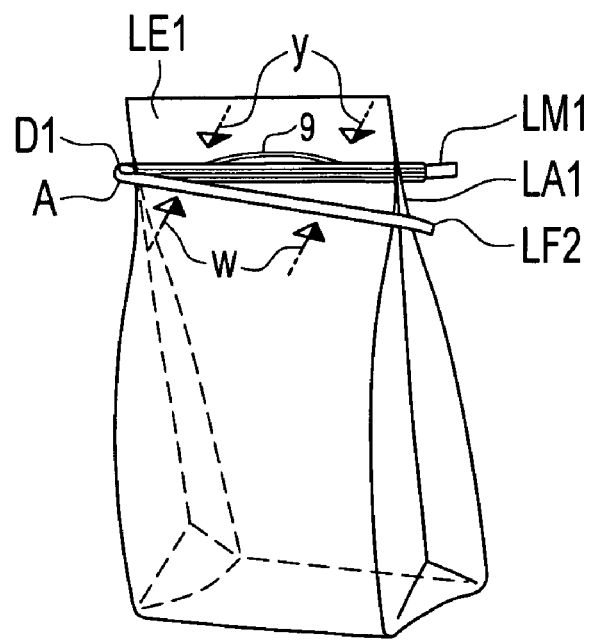
Figure 5B:
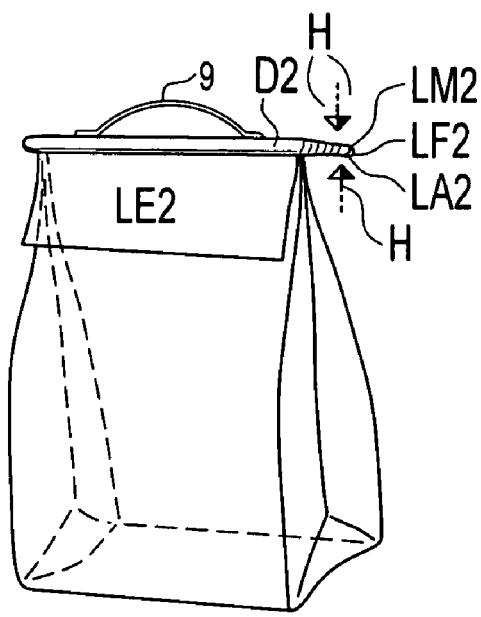
Figure 6A:
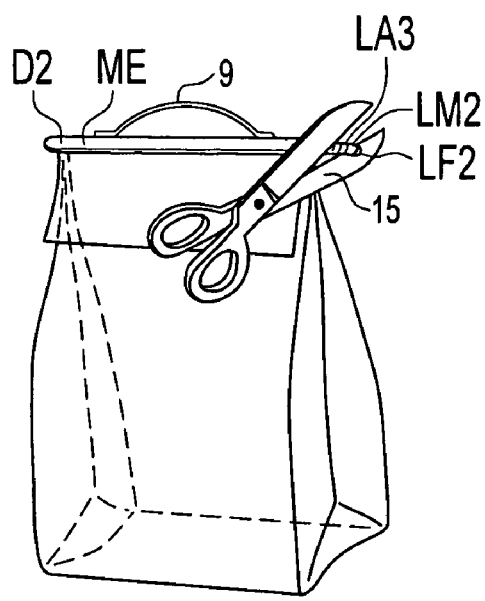
Figure 6B:
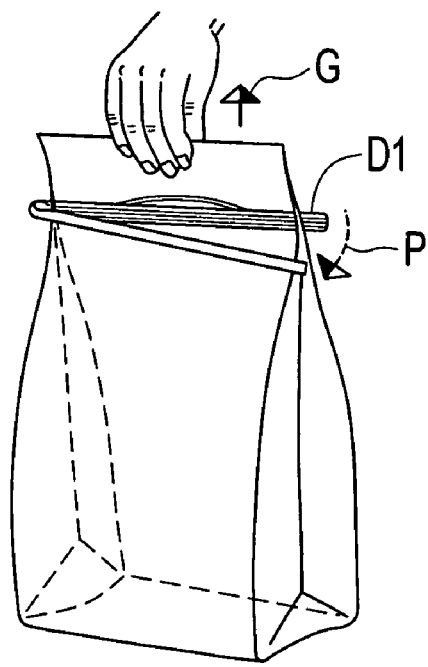

In all the drawings the invention core, i.e. the multifunctional clip device D to repeatedly open-close, to tear cut, to signal tampering, movement, volumes to extract, conjunctions without snap-springs, on-line assembly etc, comprises the elements male M and female F in their various phases and positions of:—opening or uncoupling (1) (FIGS. 1, 3A, and 5A);—coupling or closure (2) (FIGS. 2, 3B, and 5B);—assembly on the container body C (FIGS. 4A and 5A); and—disassembly (3) (FIGS. 6A and 6B).

Typically the male element M has an outer surface ME e.g. semi-cylindrical (FIG. 1) or flat (FIG. 3A) and an inner surface MI of the tongs jaws type consisting of two stiff portions 6, 6' separated by a pit or empty space V (e.g. in the shape of an inverted V).

The inner surface FI of the female element F can have a horseshoe configuration comprising flanks 7-7' forming an open mouth at the end facing element M, and bottom SF within which is a projection (projecting ridge) RI having e.g.; a truncated cone shape with cylindrical generatrix, complementary to said pit V within the male element M.

Figure 3A:
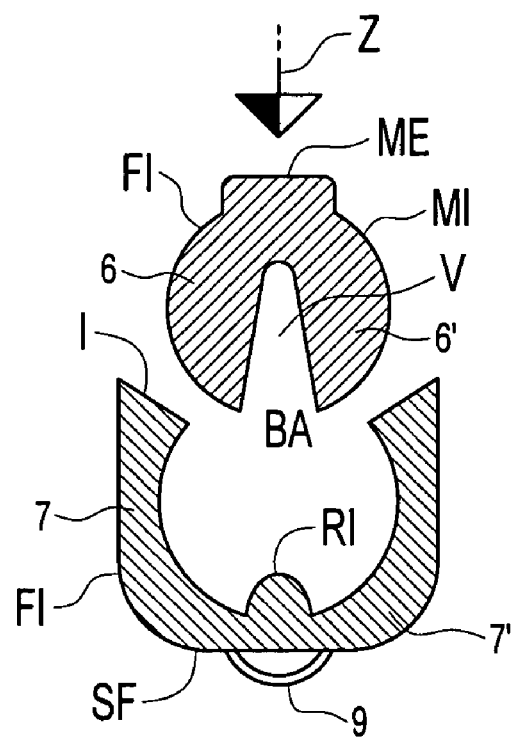
FIGS. 3A and 3B are schematic transversal cross-section views of M and F in the open (1) and closed (2) positions, respectively.
Figure 3B:
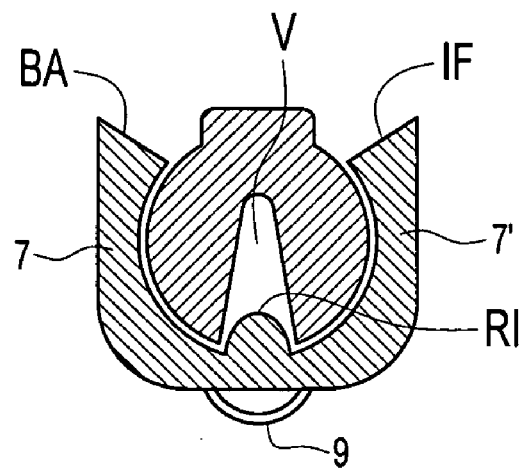

Preferably flanks 7, 7' are so chamfered to create an inviting funnel portion IF which facilitates the penetration of M within F (see FIGS. 3A and 3B). Typically at least one of said two flanks, e.g., flank 7, is provided at its top with a cut knurl 10.

The inner structures MI of M and FI of F are such to realize a rigid-elastic coupling which can be uncoupled by manual forces. Still typically, said two members M and F are coupled at one end with an articulation A formed by two extensions AM and AF (integral with M respectively F) having material compounds less rigid than that of the major portions of M and F, and dimensions (above all, the length of the protrusion ES) and thicknesses such as to bring about an elastic means of a spring without uncontrollable snaps or releases which could unexpectedly cause the opening or detachment of the device D from the container C.

At the end opposed to A, each member M and F is provided with a tongue LM, LF which bring about an anti-tampering means LA by their reciprocal coupling.

Also the structure (composition and dimensions) of tongues LM and LF is preferably different from that of the bodies or major portions of M and F as well as of A. Preferably said tongues will be easily bondable to each other and their union LA will be detached or cut, e.g. with the aid of scissors 15 (FIG. 6A).

Indeed to act as an anti-tampering means LA has not to be opened or closed by a difficulty observable action. If LA is anyhow opened, it must leave a visible sign of the modification of its initial or precedent configuration.

Typically also the limb LA of the closed mouth of container C has an coupling zone in one or more positions. If left open, said mouth is closed by twisting the bag wall top portions to form a fore-lock.

Figure 4A:
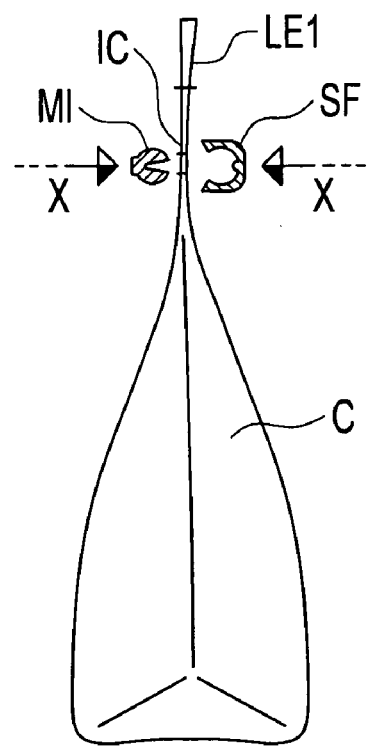
FIGS. 4A-4B, 5A-5B, and 6A-6B are schematic perspective views of the system of the invention in its configuration of the device D1 open on bag C, respectively closed D2, with the anti-tampering means LA open in position LA1 (FIG. 5A) respectively closed in position LA2 (FIG. 5B) and cut LA3 (FIG. 6A) with the consequent return to the initial open configuration D1 (FIG. 6B)
Figure 4B:
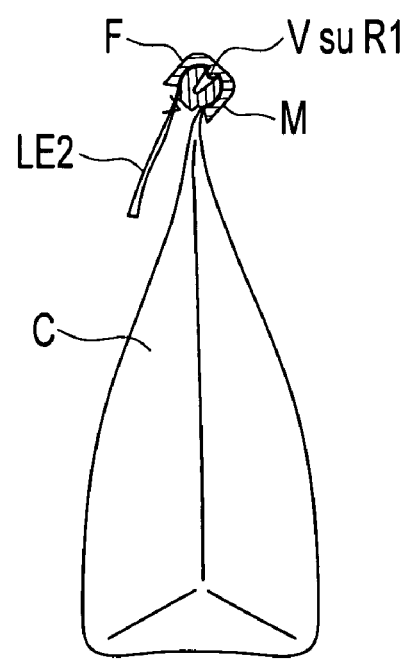

The positioning of device D1 (open) takes place as in FIG. 5A namely by placing M and F each on a face of container C, in correspondence of the coupling IC (FIGS. 4A and 5A), in that disposition male element M is pushed (arrow Z of FIG. 3A and arrows X of FIG. 4A) against female element F taking thereby the pit V of M on horseback of protrusion RI of F as in FIG. 3B and taking limb LE of the mouth of bag C from its erect position LE1 of FIG. 4A to the fold position LE2 of FIG. 4B. The uncoupling takes place as in FIGS. 6A and 6B. Starting from the configuration of FIG. 5B the closed anti-tampering means LA2 is opened by detaching the tongues LM2 from LF2 (or vice-versa) or, more rapidly, by cutting with scissors 15 the coupled elements LM2-LF2. At this point limb LE2 is raised upwards (arrow G) taking it from the fold position of FIG. 4B to the raised position of FIG. 6B and a force is applied on device D1 in the direction of arrow P, so to detach the jaws 6-6' of MI from the protrusion RI of F.

The raised limb LE.1 of container C is thereby pushed against the knurl 10 which carries out a soft tear or cut.

Advantageously a handle 9 is obtained on the outer surface of one of the two elements, preferably of the element which will take the more external disposition, e.g. on the back of female element F as in the FIGS. 3A and 3B.

This handle acts as effective means to move or displace container C which, even if fully loaded, will have such a weight to not disconnect the form- or joint-coupling of FIG. 3B.

The complex members M and F of clip device D are manufactured by extrusion-injection of plastomeric compounds such as olefinic co-polymers with major or minor amounts of elastomers (natural or synthetic rubbers in particular ter-co-polymers of styrene, butadine, butylene, acrylontrile, ethylene, propylene, dienes etc.).

Significantly the articulation means S (spring without unexpectedly loosing snaps) and the anti-tampering means LA are made from compounds of polyolefinic plastomers (PE, PP etc.) and of not-negligible amounts of elastomers so to have the desired elasticity and softness in contrast with the stiffness of the compound forming the major portions of M and F. The same applies to the inner surface of M and F. After all, differentiated compounds will be extruded in succession to form thus members M and F with relevant appendices A and LA, having also differentiated plastic-elastomeric behavior.

Figure 7A:
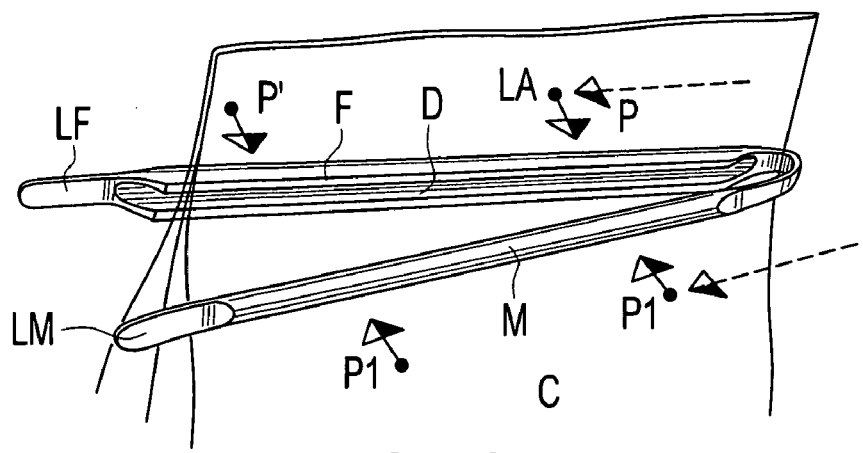
Figure 7B:
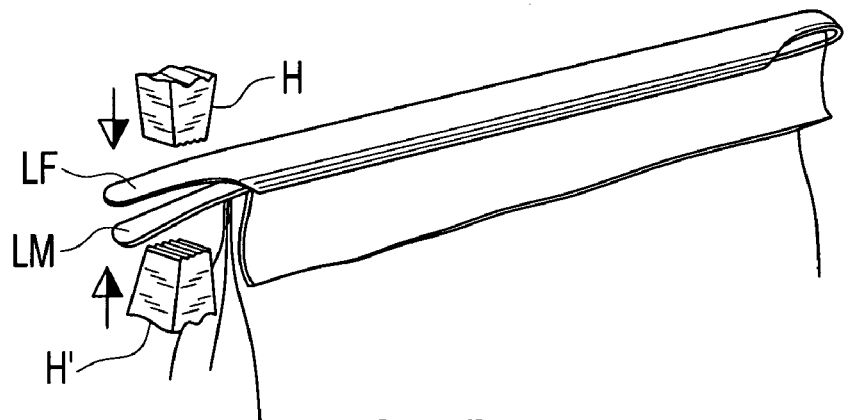
Figure 7C:
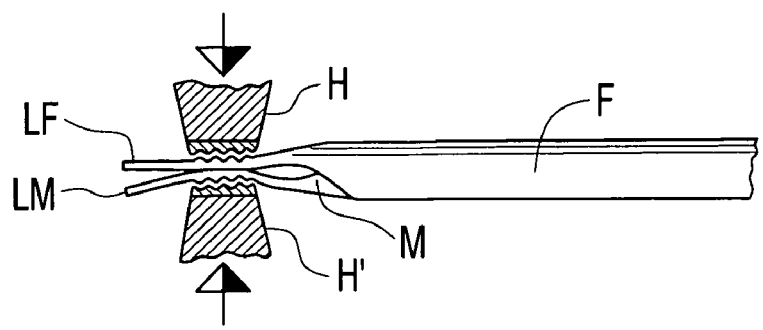
FIG. 7C is a front view of said post-soldered tongues.

In the current industrial practice are commercially available machines, compounds, ingredients etc. for the simplest and mostly performant embodiment of the system according to the invention involving a clip device with the surprising combination of an opening/closing means, of an articulation means (spring without snaps), of an anti-tampering means, of a displacing means, of a tear-cut means, of a conjunction means etc. to assembly in correspondence of the container limb portions provided with adequate coupling means;

FIGS. 7A, 7B, and 7C show a clip D which is inserted on the closed mouth LA of a bag C, out or at the end of a fill and form line; the insertion and closure means being simply indicated in the form of pliers, sucker-pliers, robotizable arms (not represented) and the like.

After the insertion (at the end of e.g. a form and filling line, FFL) and the closure (preferably with the aid of pliers) the closed mouth portion LA is folded downwards (90° degree rotation) and two soldering heads H-H' weld the tongues LF-LM in their horizontal superposed position of FIGS. 7B and 7C; The advantage is that the insertion and closure step of FIG. 7A, e.g., with the aid of any pliers, the downward folding of the bag mouth with the closed clip, and the welding of said lips LF-LM can be made at any moment, out of the e.g. FFL line, with portable means generally at the disposal of any user, even e.g. housewives.

In FIGS. 8A and 8B is shown an improved clip to avoid easy unhooking or uncoupling.

Indeed especially in the case of heavy bags, e.g., above three kilos, clips tend easily to uncouple and unhook. It has been found that by simply applying a reinforcing sleeve RS showing preferably a toothed grip TG, on at least a portion of the female F, this last element presses the male element M exerting thereby a strong coupling force avoiding any unexpected unhooking under a bag heavy load. Sleeve RS can be on a portion of the male element M and in correspondence thereof the female element F raised shoulders to receive the sleeve and compress it.

Figure 9A:
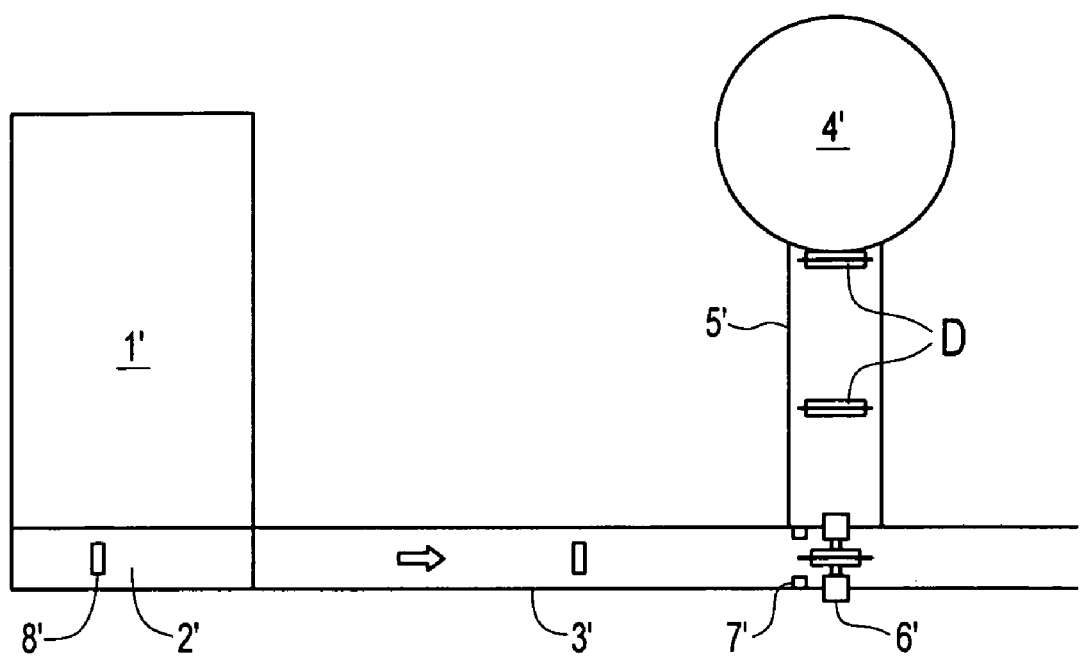
FIGS. 9A-9C and 10 are top view of systems apparatus to assembly on-line the clips and bags.
Figure 9B:
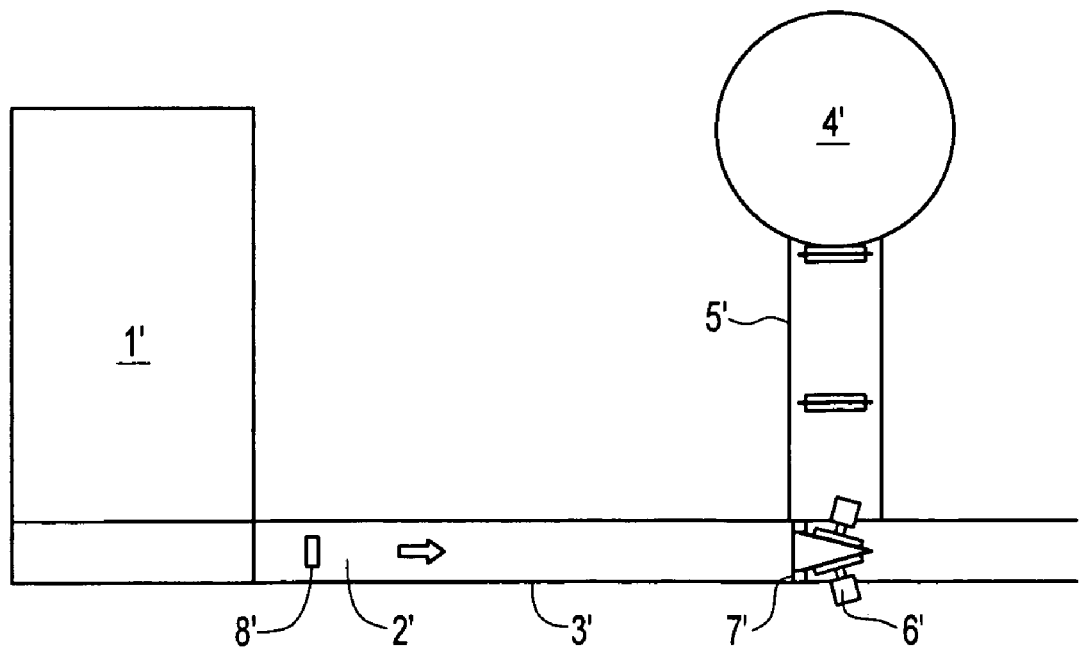
Figure 9C:
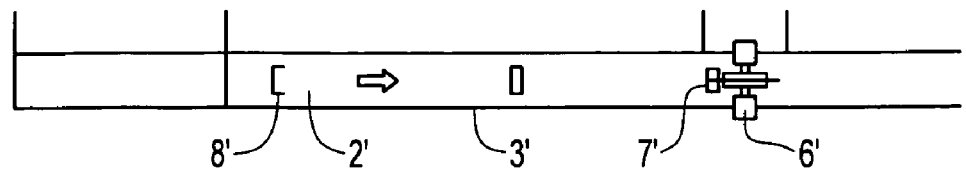

FIGS. 9A, 9B, and 9C show an apparatus (fully- or semi-automated) to assembly clip D and bags. It comprises substantially a line with a conveyor belt 3' receiving, on one side, formed and filled bags 2' from a packaging unit 1' and, from an other side, clips D (on a suitable carrier) from the vibrating-screening basket 4' feeding clips to a descending channel 5' which, on its turn, feeds said clips to a device 10' comprising pneumatic pliers 6' that take said clips from the carrier, open them, insert and block them on the bag heads.

The movement of the bags 2' from the packaging unit 1' can be facilitated by an optional pusher 8'. The pliers 6' open the clip automatically on the first contact with the bag. Once the clips are inserted and fixedly blocked on the bag, a couple of sealing embossers 7 is taken into contact with the bag head and welds the tongues or lips LF-LM (compare FIGS. 9B and 9C).

Figure 10:
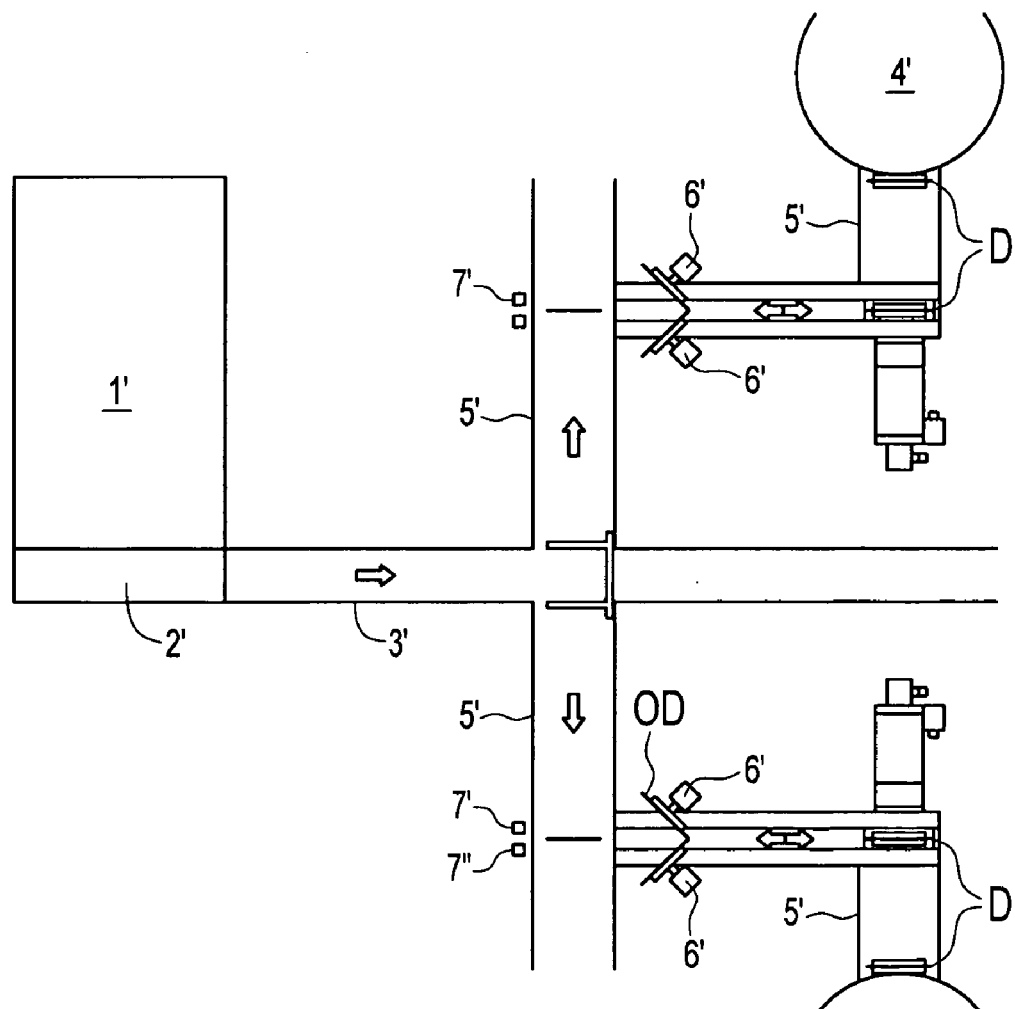

FIG. 10 shows a speedy apparatus in which the feed of filled bags from 1' is quicker, the bags from conveyor 3' are alternatively sorted on two arms 5' which feed two stations in parallel each comprising a contact device with pneumatic pliers to open the clip OD on the arrival of the bags 2.

The opened clip arms are inserted on the bag mouth and the tongues or lips at the ends of the clip arms are automatically welded.

Even if the invention has been described with reference to the embodiments shown in the accompanying drawings, same invention is susceptible of all those modifications, substitutions, variants additions and the like which, being at the reach of a mean technician of this field, are to be considered included in the scope and in the spirit of the invention.

The invention claimed is:

1. A clip for closing sheet-formed containers having a mouth at one end, the clip comprising:
    a male element substantially longitudinal in shape and having first and second ends;
    a female element substantially longitudinal in shape and having first and second ends;
    a coupling joining the first end of the male element and the second end of the female element, acting as a snap-free spring, and formed of continuous protuberances integral with each other and with the male and female elements;
    an anti-tampering means comprising a first tongue at the second end of the male element and a second tongue at the second end of the female element;
    a sealing means comprising a first fixed joint formed in or on the male element and a second fixed joint complementary to the first fixed joint and formed in or on the female element; and
    a cutting or tearing means on a top of the female element, wherein the clip is configured to be inserted in a open configuration on the mouth of the container and to seal the container by assuming a closed configuration.

2. The clip according to claim 1, wherein the male-element has a solid cylindrical shape and the female element has an at least partially hollow shape.

3. The clip according to claim 1, wherein a cross-section of the male element is shaped as partially opened pincers.

4. The clip according to claim 1, wherein a cross-section of the female element is shaped as a horse shoe with a central male protrusion penetrating into an open portion of the male element.

5. The clip according to claim 1, wherein a top inner portion of a flank of the female element is formed as a knurl.

6. The clip according to claim 1, further comprising a reinforcing partial sleeve, wherein the sleeve is on a portion of the female element and has on outer toothed grip.

7. The clip according to claim 1, wherein the male element is configured to be inserted into the female element with the aid of pincers and the first and second tongues are configured to be welded together by heat-sealing heads.

8. The clip according to claim 1, further comprising a transportation means.

9. The clip according to claim 8, wherein the transportation means comprises a handle on an outer back of the female element.

* * * * *